(12) United States Patent
Loureiro (10) Patent No.: US 9,932,122 B2
(45) Date of Patent: Apr. 3, 2018

(54) GAS TURBINE ENGINE COVER (71) Applicant: PRATT & WHITNEY CANADA CORP., Longueuil (CA)

(72) Inventor: Carlos Adelino Marques Santos Loureiro, Oakville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 15/376,697

(22) Filed: Dec. 13, 2016

(65) Prior Publication Data

US 2017/0089126 A1     Mar. 30, 2017

Related U.S. Application Data

(62) Division of application No. 14/632,254, filed on Feb. 26, 2015, now Pat. No. 9,550,581.

(51) Int. Cl.
| | |
|---|---|
| *B64D 33/04* | (2006.01) |
| *E06B 9/02* | (2006.01) |
| *F02C 7/055* | (2006.01) |
| *B64D 33/02* | (2006.01) |
| *B64C 7/02* | (2006.01) |
| *B64D 29/00* | (2006.01) |
| *B64F 1/00* | (2006.01) |

(52) U.S. Cl.
CPC ............... *B64D 33/04* (2013.01); *B64C 7/02* (2013.01); *B64D 29/00* (2013.01); *B64D 33/02* (2013.01); *B64F 1/005* (2013.01); *E06B 9/02* (2013.01); *F02C 7/055* (2013.01); *B64D 2033/022* (2013.01)

(58) Field of Classification Search
CPC ..... B64F 1/005; B64D 2033/022; F02C 7/055
See application file for complete search history.

(56) References Cited

U.S. PATENT DOCUMENTS

| | | | | |
|---|---|---|---|---|
| 2,744,382 | A | * | 5/1956 | Sokol ...................... B64F 1/005 160/368.1 |
| 2,944,631 | A | | 7/1960 | Kerry et al. |
| 3,168,999 | A | * | 2/1965 | Warren .................. B64D 33/02 244/53 R |
| 3,646,980 | A | * | 3/1972 | Peterson ................... F02C 7/00 138/89 |
| 4,833,879 | A | * | 5/1989 | Verduyn ................ B64D 33/02 55/306 |
| D303,784 | S | | 10/1989 | Micallef |

(Continued)

FOREIGN PATENT DOCUMENTS

| | | | | |
|---|---|---|---|---|
| DE | 202012100112 | | 2/2012 | |
| EP | 2615035 A2 | * | 7/2013 | ............. B64F 1/005 |

(Continued)

*Primary Examiner* — Katherine W Mitchell
*Assistant Examiner* — Marcus Menezes
(74) *Attorney, Agent, or Firm* — Norton Rose Fulbright Canada LLP (57) ABSTRACT

A protective cover for an aircraft engine comprises a lower portion mountable to a corresponding lower portion of an opening of the engine, and an upper portion articulated to the lower portion. The upper portion is deployable from a collapsed position to a deployed position in which the upper portion extends upwardly from the lower portion. A handling tool may be used to operate the panel from a remote location on the ground.

5 Claims, 9 Drawing Sheets

(56) References Cited

U.S. PATENT DOCUMENTS

| | | | |
|---|---|---|---|
| 5,143,321 A * | 9/1992 | Jackson | B64F 1/005 244/121 |
| RE35,831 E * | 6/1998 | Wright | G01P 5/165 150/154 |
| 6,089,824 A | 7/2000 | Soares | |
| 6,186,349 B1 | 2/2001 | Tempongko | |
| 6,871,819 B2 * | 3/2005 | Garric | B64F 1/005 244/1 R |
| 7,625,415 B2 * | 12/2009 | Durocher | B01D 39/12 244/53 B |
| 7,752,876 B2 | 7/2010 | Meekma et al. | |
| 8,651,415 B1 * | 2/2014 | Sparks | B64F 1/005 244/121 |
| 8,756,909 B2 | 6/2014 | Avery | |
| 8,777,154 B2 | 7/2014 | Alexander et al. | |
| 8,950,701 B2 * | 2/2015 | Sparks | B64F 1/005 244/121 |
| 9,206,703 B2 * | 12/2015 | Tadayon | F01D 25/002 |
| 2004/0195437 A1 | 10/2004 | Garric | |
| 2009/0301913 A1 | 12/2009 | Scaletta et al. | |
| 2011/0011055 A1 | 1/2011 | Troy | |
| 2011/0047732 A1 * | 3/2011 | Phillips | B08B 1/00 15/118 |
| 2011/0146294 A1 * | 6/2011 | Townsend | F02C 7/055 60/779 |
| 2014/0008497 A1 | 1/2014 | Alexander et al. | |
| 2015/0089879 A1 * | 4/2015 | Sparks | B64F 1/005 49/460 |

FOREIGN PATENT DOCUMENTS

| | | | | |
|---|---|---|---|---|
| FR | 713634 A | * | 10/1931 | B64F 1/005 |
| GB | 1507914 A | * | 4/1978 | B64D 33/02 |
| GB | 1507914 A | | 4/1978 | |
| JP | H02238130 A | | 9/1990 | |

\* cited by examiner

FIG. 5

GAS TURBINE ENGINE COVER

RELATED APPLICATION

This application is a divisional of U.S. patent application Ser. No. 14/632,254 filed on Feb. 26, 2015, the content of which is hereby incorporated by reference.

TECHNICAL FIELD

The application relates generally to gas turbine engines and, more particularly, to engine covers.

BACKGROUND

Even when not operated, aircraft engines are vulnerable to foreign objects and adverse weather conditions. Small animals could, for example, access the engine via the open air intake or exhaust, or sand could accumulate in the engine and damage the engine when the engine is run again. Accordingly, it is desirable to cover these openings when the aircraft is not in service.

Depending on the size of the aircraft and the position of the engine, several operators may be needed to install conventional protective covers to the engine nacelle. In some instances, due to engine installation height, the operators may even have to climb ladders to install the engine covers, which may present safety concerns particularly when performed under adverse weather conditions.

SUMMARY

In one aspect, there is provided a kit for protectively covering an opening of an aircraft engine, the kit comprising: a cover including a base having an arcuate lower surface configured to mate with an inner surface of a lip of one of the intake and exhaust portion of an engine casing of the gas turbine engine; and a panel movably connected to the base between a first position where the panel is stowed and a second position where the panel is deployed to close off the opening of the engine, the panel having at least one handling feature. The kit further comprises a handling tool having a handle portion and an operative end disposed opposite to the handle portion, the operative end cooperating with the at least one handling feature of the panel for moving the panel between the first position and the second position from a remote location.

In another aspect, there is provided a protective cover for closing an opening of a gas turbine engine, the protective cover comprising: a lower portion mountable to a corresponding lower portion of the opening of the gas turbine engine, and an upper portion articulated to the lower portion, the upper portion being deployable from a collapsed position to a deployed position in which the upper portion extends upwardly from the lower portion.

In a further aspect, there is provided a method of covering an opening at one end of an aircraft engine, the method comprising: snug-fitting a base of an engine cover into a lower portion of the opening of the engine, the base having an arcuate lower surface configured to mate with an inner surface of a lip of the opening of the engine, the cover having a panel movably connected to the base; using a handling tool for engaging the panel from a location remote from the aircraft engine and subsequently using the handling tool for moving the panel from a collapsed position to a deployed position in which the panel extends upwardly from the base to close the opening of the aircraft engine.

DESCRIPTION OF THE DRAWINGS

Reference is now made to the accompanying figures in which.

DETAILED DESCRIPTION

Figure 1:
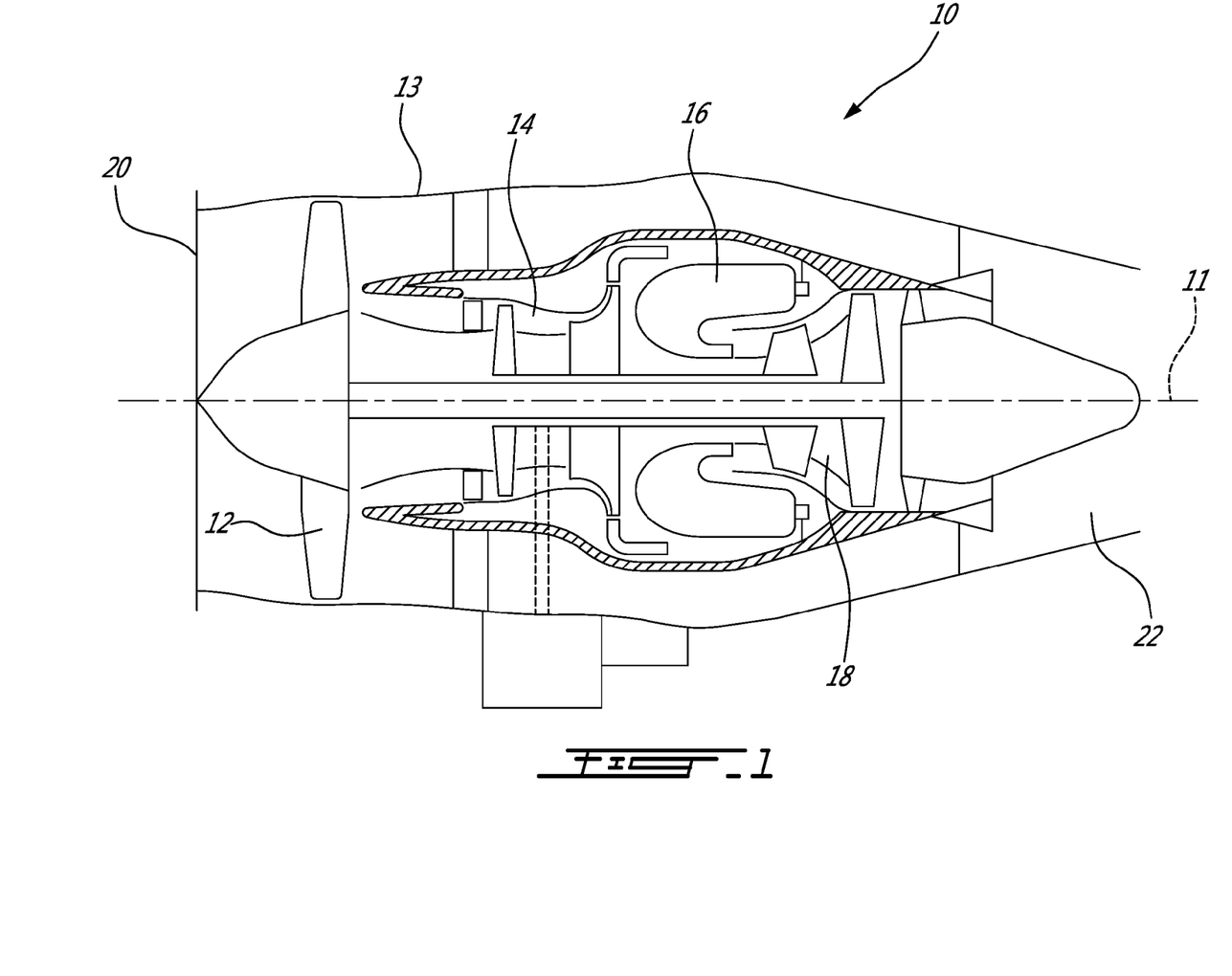
FIG. 1 is a schematic longitudinal cross-section view of a gas turbine engine.

FIG. 1 illustrates an example of a gas turbine engine 10 (e.g. a turbofan) of a type preferably provided for use in subsonic flight, generally comprising in serial flow communication along an engine axis 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The internal components of the engine 10 are mounted within an engine casing 13. The casing 13 is open at both ends. It includes an air intake 20 through which the ambient air is propelled by the fan 12, and an exhaust duct 22 through which the exhaust gases are expelled. The air intake 20 and the exhaust duct 22 are herein generally referred to as engine openings.

Figure 2:
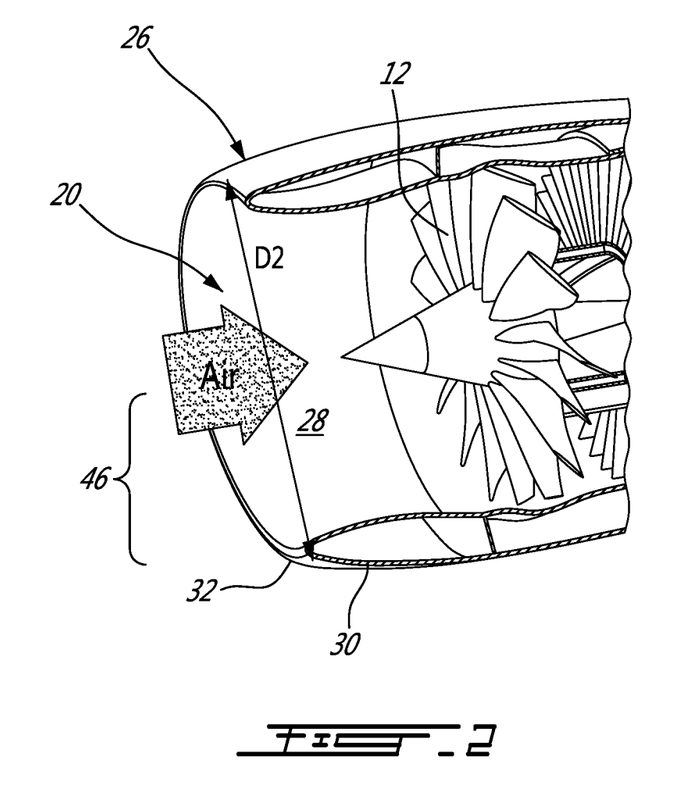
FIG. 2 is a schematic front isometric cross-section view of an air intake portion of the gas turbine engine of FIG. 1.

FIG. 2 illustrates an air intake portion of the engine casing 13. The air intake portion includes an air intake lip 26, having a radially inner surface 28, a radially outer surface 30 and a front leading edge 32 circumscribing the air intake 20. The air intake lip 26 may be lined with a metal layer. The exhaust duct 22 could also include an exhaust lip similar to the air intake lip 26.

Figure 3:
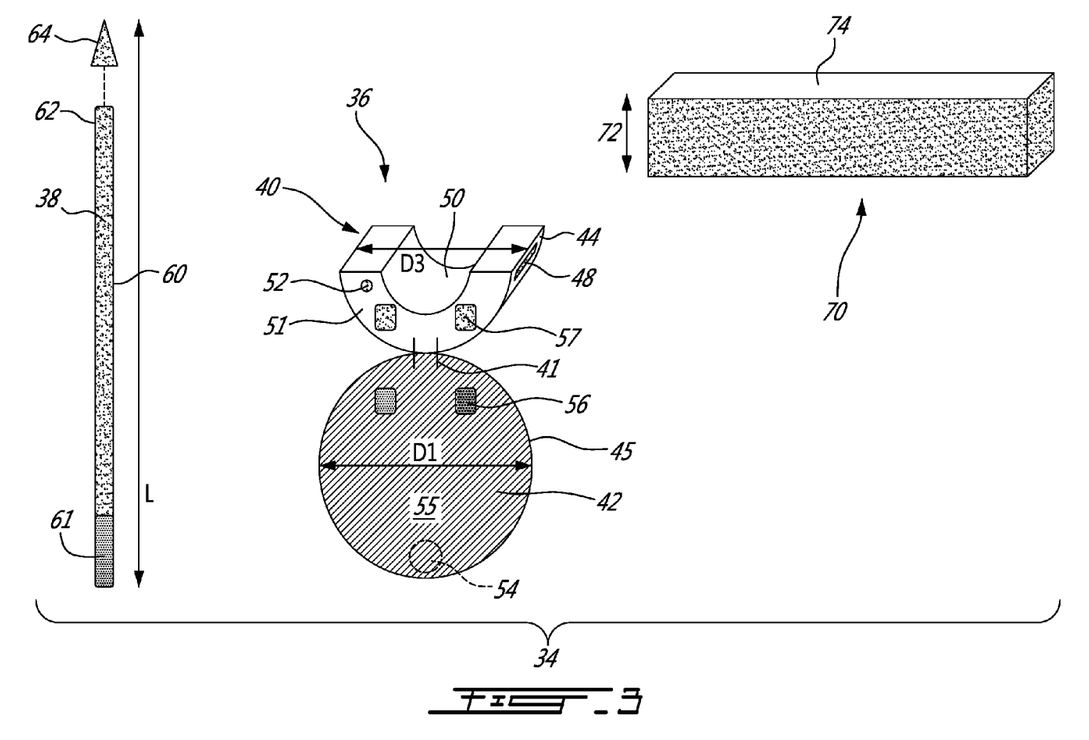
FIG. 3 is a schematic perspective view of an engine cover kit including a protective cover for covering an engine opening (e.g. an air intake or an exhaust duct) of a gas turbine engine, such as the one shown in FIG. 1.

Turning now to FIG. 3, there is shown an engine cover kit 34 for covering an engine opening, such as the air intake 20 or the exhaust opening 22, when the aircraft is parked. The kit generally comprises at least one cover 36 which may be configured to also extend over a portion of the intake lip 26 or the exhaust lip of the engine. The kit 34 further comprises a handling tool, such as pole 38, to manipulate the cover 36 from the ground by a single operator and without having recourse to a ladder. It is understood that the kit 34 will generally include enough covers 36 to individually cover all engine openings of each engine of the aircraft.

The cover 36 may include a lower portion, such as base 40, mountable to a corresponding lower portion of the engine opening to be covered and an upper portion, such as panel 42, articulated to the lower portion for movement between a collapsed position suitable for storage purposes and a deployed position in which the upper portion extends upwardly from the lower portion for covering the opening to be closed. In the example shown in FIG. 3, the panel 42 is hinged to the base 40 for pivotable movement with respect thereto. However, it is understood that other suitable articulation could be provided as well.

For illustration purposes, the cover 36 will now be described in connection with the air intake 20. The base 40 has an arcuate lower surface 44 having a half cylindrical shape conforming to that of the inner surface 28 of the air intake lip 26 so as to mate therein. The base 40 is designed to snuggly fit into a lower portion 46 of the air intake 20 (shown in FIG. 2). In one embodiment, the lower surface 44 mates with a lower half of the inner surface 28 of the air intake lip 26. The base 40 may include a pad 48 on the lower surface 44 to provide frictional engagement for an improved connection between the lower surface 44 of the base 40 and the inner surface 28 of the air intake lip 26 when the base 40 is positioned in the air intake portion of the engine casing 13. The friction pad 48 could be covering an entirety of the lower surface 44 or be composed of a plurality of discrete pads disposed along the lower surface 44 of the base 40. The pad 48 could also be integrally formed with the lower surface 44. For example, the lower surface 44 or the pad 48 may be made of a material having some gripping or adhering properties, such as limited gluing action, relative to the inner surface 28 of the air intake lip 26. However, it understood that the securing action should not be so strong that it would impair regular positioning and removing of the cover 36.

The base 40 has an arcuate upper surface 50 having a half cylindrical shape. While in this embodiment, the upper surface 50 of the base 40 is shown to have a same shape as the lower surface 44 of the base 40, it is contemplated that the upper surface 50 could be shaped differently from the lower surface 44. The upper surface 50 could, for example, not match the shape of the inner surface 28 of the air intake lip 26. The inside surface 50 could for example be straight, such that the base 40 as a whole would be a plain half cylinder.

According to the embodiment illustrated in FIG. 3, the base 40 does not include any fasteners that would cooperate with the air intake lip 26 or the engine casing 13 in general. The base 40 is intended to be only snug fitted onto the inner surface 28 of the air intake lip 26. The base 40 may include, however, handling features 52 to facilitate manipulating of the base 40 with the pole 38 when installing and removing the cover 36 from the air intake portion of the engine casing 13. For example, the handling feature 52 could be a recess, a handle, a hook, a magnet, a quick release connector, etc. In one embodiment, the handling feature(s) 52 is disposed on a front surface 51 of the base 40. However, it is understood that the base 40 could be manipulated without the handling feature(s) 52.

The panel 42 is connected to the base 40 by hinge 41 at the front surface 51 of the base 40. The panel 42 is disk shaped and sized, in one embodiment, to fit over the leading edge 32 of the air intake lip 26. As such, a diameter D1 of the panel 42 is at least equal to a diameter D2 of the edge 32 of the air intake lip 26. According to an embodiment, the diameter D1 is larger than a diameter D3 of the base 40. It is contemplated that the diameter D1 of the panel 42 could be smaller than the diameter D2 of the leading edge 32, and that the cover 36 could include flaps distributed about a perimeter 45 of the panel 42 that could be flipped to cover the edge 32. The panel 42 may also have circumferential flaps, such as flaps 66 shown in FIG. 4C, to cover the outer surface 30 of the air intake lip 26. The panel 42 may be made of a single sheet of flexible material or of several portions of rigid or flexible material, the portions being articulated relative to each other. Embodiments where the panel 42 is made of several portions will be described below with respect to FIGS. 5 and 6. Should the material of the panel 42 be chosen to be a flexible material, the material may not be so flexible that it will not stay right up when the panel 42 is positioned vertically when closing up the air intake 20, but the material could have some flexibility to ease installation of the panel 42 onto the air intake portion of the engine casing 13. The material could also be totally rigid. In one embodiment, the panel 42 is made of ballistic nylon.

The panel 42 may include one or more handling features 54 (shown in phantom, and shown in plain in FIG. 4B) disposed on the outer surface 53 of the panel 42. The outer surface 53 is the surface that will be facing away from the gas turbine engine 10 when the cover 36 is installed on the air intake portion 24. The one or more handling features 54 allow to manipulate the panel 42 with the pole 38 during installation of the cover 36. In one embodiment, the handling features 54 is a unique recess disposed at an end of the panel 42 opposite to a connection of the panel 42 to the base 40. In another embodiment, the handling feature 54 is a protrusion "hookable" by a hook disposed at an end of the pole 38. It is understood that any suitable handling feature could be used to allow remote manipulation of the panel 42 with the pole 38.

The panel 42 may include retaining features such as attachments 56 on an inner surface 55 of the panel 42 cooperating with associated attachments 57 on the front surface 51 of the base 40 to connect the panel 42 to the base 40 when the panel 42 is deployed to its operational upright position for closing the air intake 20, thereby automatically restraining the panel 42 from moving relative to the base upon the panel reaching its deployed position. The inner surface 55 is the surface that will be facing towards the gas turbine engine 10 when the cover 36 is installed on the air intake portion. The one or more attachments 56 provide added connection between the base 40 and the panel 42 so as to maintain the panel 42 in its functional upstanding position. This may be useful when the panel 42 is not connect to the air intake lip 26 other than via the base 40. This allows the panel 42 to be only disposed onto the air intake 20, protecting the inside surface 28 and the edge 32 of the air intake lip 26 with no fasteners between the panel 42 and the engine casing 13. The attachments 56 could be a plurality of hooks engaging a plurality of loops forming the attachments 57 of the base 40 (or vice versa). The hooks and loops could for example be Velcro®. The attachments 56 could be magnets cooperating with metallic pads forming the attachments 57 of the base 40 (or vice versa). The front surface 51 of the base 40 could itself be metallic such that the attachments 57 could be omitted. Alternatively, the hinge 41 could be self-locking and the attachment 56 could be omitted. Any suitable retaining features could be used to prevent the panel from moving relative to the base once it has reached its deployed position. This contributes to facilitate the installation of the cover from a remote location in that there is no need to attach the panel to the upper portion of the engine which may be difficult to reach from the ground.

As mentioned herein above, the pole 38 is used to manipulate the cover 36 during installation and removal from the air intake portion of the engine casing 13. Using the pole 38 may avoid having to climb a ladder to install the cover 36 when the aircraft engines are disposed at higher elevations.

The pole 38 may have a tubular body 60, a handle portion 61 where an operator grabs the pole 60, and an operative end 62 with which the cover 36 may be manipulated. The body 60 may be plain or hollow. The body 60 may be telescopic. While the body 60 is illustrated herein as being straight, it is contemplated that the body 60 could be curved, or have one or more bend, depending on a configuration of the cover 36. The body 60 could also be articulated. The body 60 could be foldable or retractable so as to take minimal space when stored. A length L of the pole 38 may be chosen or adjusted to effectively allow an operator to manipulate the cover 36 from the ground.

The end 62 of the pole 38 may be free, or may include a gripping tool 64 to facilitate manipulation of the cover 36. In one embodiment the gripping tool 64 is a hook or a plier. In another embodiment, the gripping tool 64 is a suction pad or a magnet. The gripping tool 64 may be selected in accordance with the handling features 54 of the panel 42. If the handling feature 54 is a hookable protrusion, the gripping tool 64 could be a hook. The gripping tool 64 may be removable from the body 60 so that various gripping tools could be connected to the body 60 depending on the task to perform. The gripping tool 64 could also be actuated via the handle portion 61. For example, should the gripping tool 64 be a pair of pliers, their opening and closing could be actuated by the operator directly from the handle portion 61. The pole 38 may be manufactured of a light yet rigid material, such as plastic.

The engine cover kit 34 may further include a storage box 70 which could contain the cover(s) 36 and the pole 38 when not in use. The storage box 70 may be made of a resistant material which would allow to use the box 70 as a step during installation of the cover 36 onto the air intake portion of the engine casing 13. The box 70 could have a thickness 72 of 1 or 2 feet, so as to position the operator at a height closer to that of the gas turbine engine 10 during installation of the cover 36. A side 74 of the box 72 receiving the operator when the box 70 is used as a step could be roughed or covered with an anti-skid material to provide added traction with feet of the operator.

Turning now to FIGS. 4A to 4D, to position the cover 36 onto the air intake portion of the engine casing 13, the operator, first positions the base 40 into the lower portion 46 of air intake portion, at the inner surface 28 of the air intake lip 26. The operator may manually place it with his/her hands directly or with the use of the pole 38 engaged with the handling features 52 of the base 40. The operator may step onto the storage box 70, should the storage box 70 be provided in the kit 34, to facilitate the positioning of the base 40. When the base 40 is installed in the air intake portion 24, the panel 42 is hanging from it due to gravity (see FIG. 4A). When disposed onto the inner surface 28 of the air intake lip 26, the front surface 51 of the base 40 may be aligned with the front leading edge 32 of the air intake lip 26, so that the panel 42 may abut the edge 32 (which is also an axial end of the engine casing 13) of the air intake lip 26.

Figures 4A, 4B, 4C:
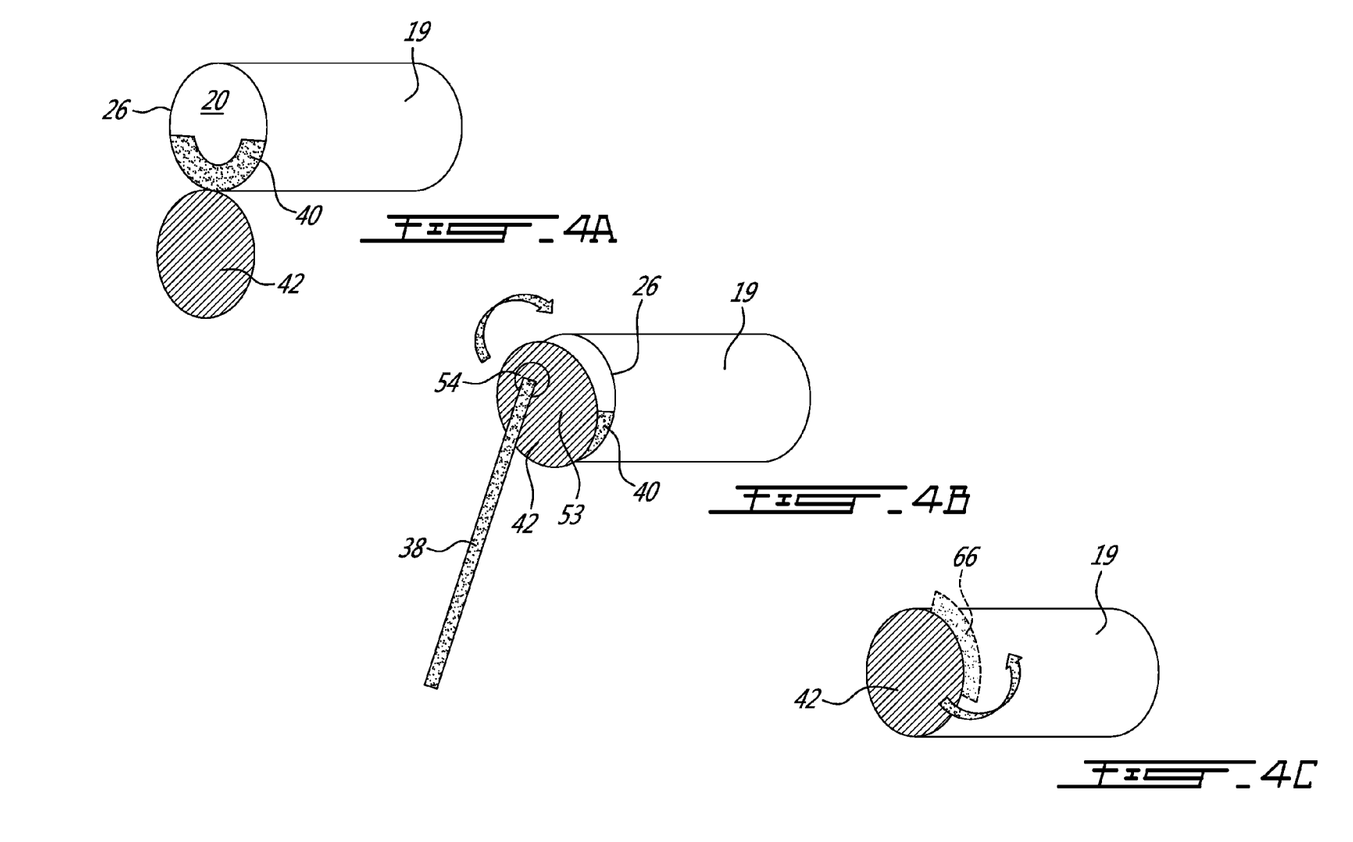
FIGS. 4A to 4C are sequential views illustrating various steps for installing the protective cover of the cover kit shown in FIG. 3.
Figure 4D:
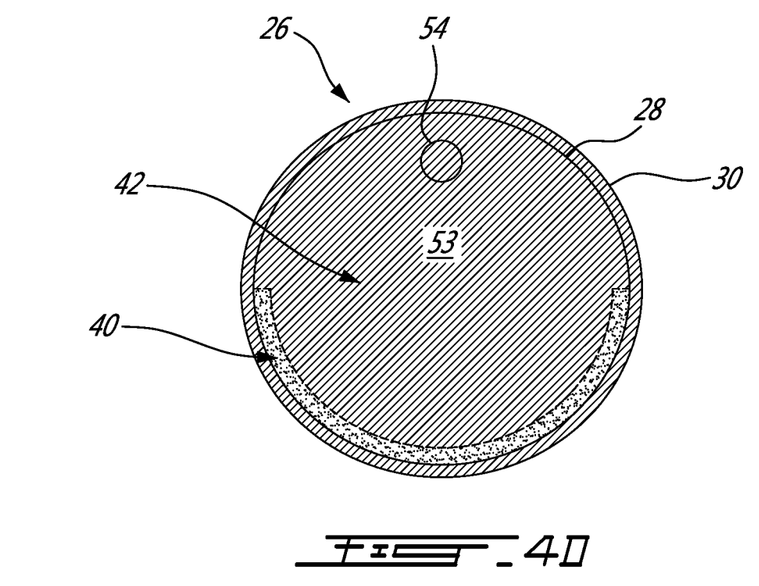
FIG. 4D is a front view of the cover once installed on the air intake portion of the engine.

Once the base 40 is snuggly fitted into the air intake portion 24, the operator may temporarily connect the pole 38 to the handling features 54 of the panel 42 so as to pivot the panel 42 from the first position (where the panel 42 is hanging down), to the second operational position, as illustrated in FIG. 4B (where the panel 42 is upright). If the handling feature(s) 54 requires it, the operator may use the gripping tool 64 connected to the pole 38.

During that motion, the attachments 56 of the panel 42 would connect to the base 40 to rigidify the panel 42 when moved toward the second position, should the cover 36 have the attachments 56. When the panel 42 is in the second position (see FIG. 4C), the air intake 20 is closed up and the edge 32 of the air intake lip 26 is covered by the panel 42. Should the cover 36 include circumferential flaps 66, the operator may use the pole 38 to fold the circumferential flaps 66 onto the outside surface 30 of the air intake lip 26. The operator may then disengage the pole 38 from the handling features 54 of the panel 42 and store the pole 38 and box 70 away.

To remove the cover 36, the user may step back on the box 70 and use the pole 38 to flip the flaps 66 should the cover 36 have flaps, and to pivot the panel 42 from the closed second position to the open first position. The user then removes the snug fit base 40 from the air intake lip 26, and may store the cover 36 with the pole 38 in the storage box 70.

Figure 5:
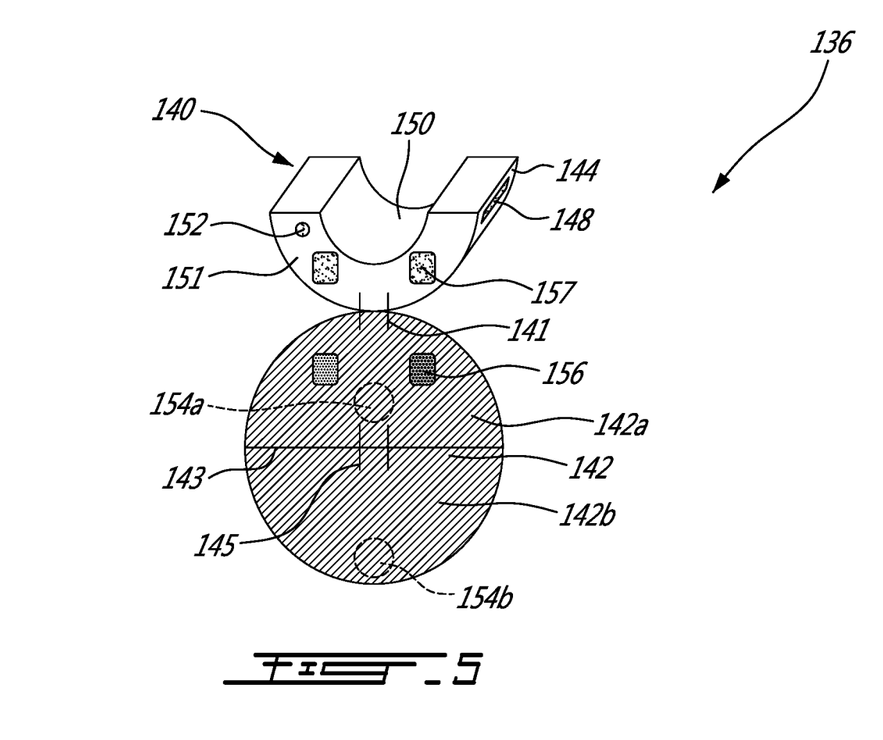
FIG. 5 is a schematic perspective view of an alternative engine cover construction.

Turning now to FIG. 5, another embodiment of a cover 136 which may be used in the kit 34, for covering one of the air intake 20 and exhaust duct 22, includes a base 140 similar to the base 40, and a panel 142 similar to the panel 42 except that it is made of two portions 142a, 142b. The base 140 will not be described in details herein again. Elements of the base 140 will bear the same reference numeral as those of the base 40 but incremented by a hundred.

Each portion 142a, 142b is a half disk, and the portions 142a, 142b are connected to each other by hinge 145. In one embodiment, the hinge 145 is self-locking. The hinge 145 may allow the portions 142a, 142b to fold onto each other, so as to conveniently store the cover 136 when not in use, in addition to easing installation of the cover 136. The portion 142a is hinged to the base 140 by hinge 141, similar to hinge 41 described above. It is however contemplated that the panel portion 142a could be fixedly connected to the base 140, thereby forming together a lower portion of the cover, and that only the portion 142b could be pivotable between a collapsed position and a deployed position. The portion 142a may include attachments 156 cooperating with attachments 157 of the base 140 similarly to the attachments 56 and 57 described above.

Each portion 142a, 142b may have its associated handling features 154a, 154b similar to the handling feature 54 described above. The panel 142 could also just have one handling feature, for example, just the handling feature 154b. The portions 142a, 142b could include circumferential flaps, similar to the flaps 66.

To install the cover 136, the user snugs fit the base 140 into the air intake lip 26, as described above. The user then moves the portion 142a in the second position and then the portion 142b using the pole 38 and handling features 154a and 154b respectively. While moving the portion 142a, attachments 156 of the panel 142 would connect to the base 140, should the cover 136 have such attachments. The user could also only move the portion 142b using the pole 38, the movement of the portion 142b toward the second position forcing the portion 142a also to the deployed position. The user may then flip the circumferential flaps onto the outside surface 30 of the air intake lip 26, should the cover 136 have such circumferential flaps.

To remove the cover 136, the user uses the pole 38 to flip the flaps back should the cover 136 have circumferential flaps, and to pivot the panel 142 from the upright closed second position to the open first position. The user then removes the snug fit base 140 from the air intake lip 26, and may store it with the pole 38 in the storage box 70.

Figure 6:
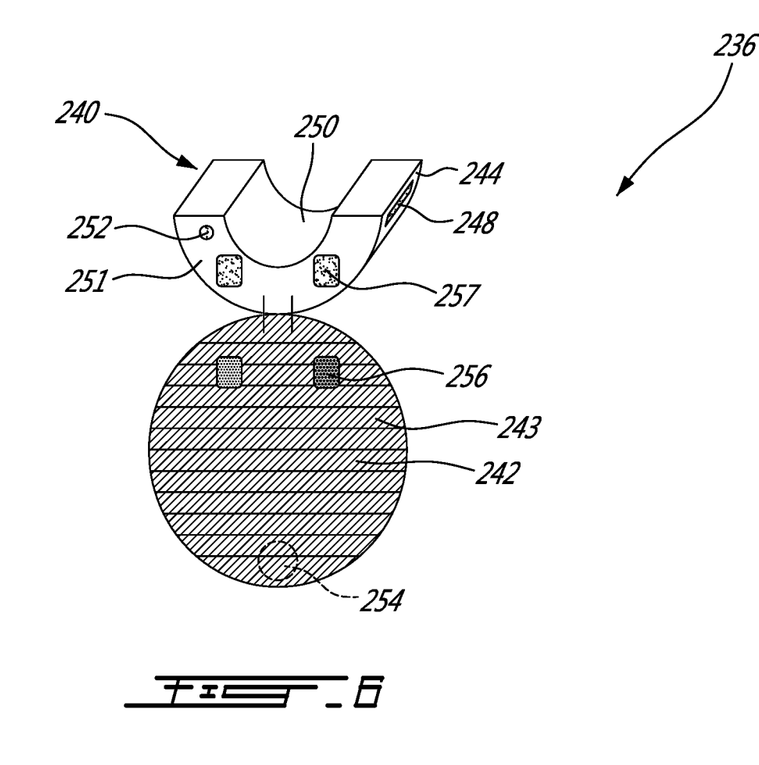
FIG. 6 is a schematic perspective view illustrating further variants of a cover that could form part of the kit shown in FIG. 3.

Turning now to FIG. 6, another embodiment of a cover 236 which may be used in the kit 34, for covering one of the air intake 20 and exhaust duct 22, includes a base 240 similar to the base 40, and a panel 242 similar to the panel 42 except that it is made of multiple portions 243. The base 240 will not be described in details herein again. Elements of the base 240 will bear the same reference numeral as those of the base 40 but incremented by two hundred. The panel 242 will not be described in details herein again. Elements of the panel 242 will bear the same reference numeral as those of the panel 42 but incremented by two hundred.

The portions 243 are elongated panels extending horizontally. By analogy they could be viewed as blind slats. The portions 243 are self-locking. In one embodiment, a lower end of each portion 243 includes a protrusion, and an upper end of each portion 243 includes a groove, such that, when in the second position, each groove of a given portion receives the protrusion of an adjacent portion.

To install the cover 236, the user snugs fit the base 240 into the air intake lip 26, as described above. The user then moves the panel 242 in the second position using the pole 38 and handling feature 254 similarly to the installation of the cover 36. During that motion, attachments 256 of the panel 242 would connect to the base 240, should the cover 236 have such attachments.

To remove the cover 236, the user uses the pole 38 to pivot the panel 242 from the closed second position to the open first position. The user then removes the snug fit base 240 from the air intake lip 26, and may store it with the pole 38 in the storage box 70.

Figure 7A:
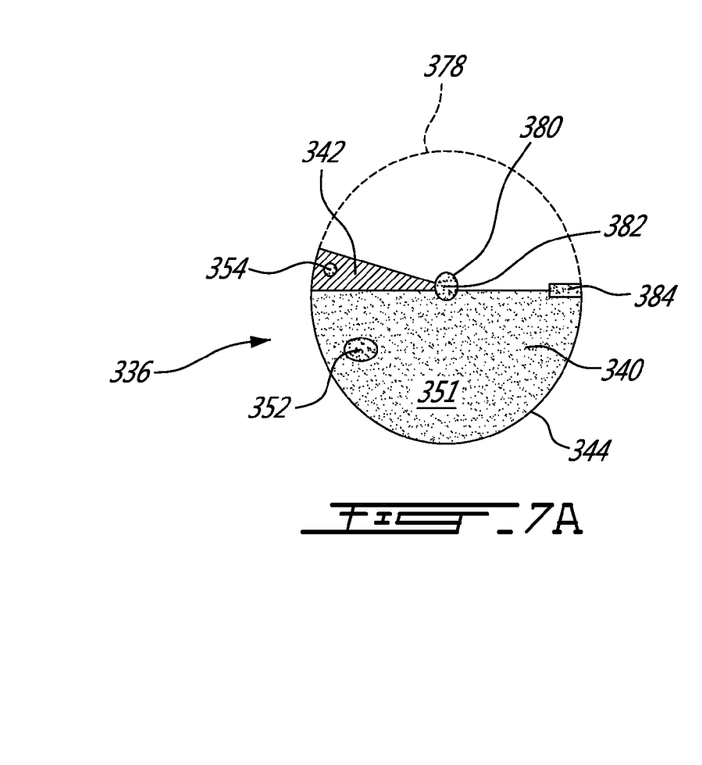
FIG. 7A is a schematic front view of another engine cover.

Turning now to FIG. 7A, another example of a cover 336 which may be used in the kit 34, for covering one of the air intake 20 and exhaust duct 22, includes a base 340 and a rotatably deployable panel 342. The panel 342 could be provided in the form of an assembly of slats or panel sections linked in an accordion fashion for pivotal movement around a common pivot between a first position in which the panel sections extend one over the other and a second position in which the panels extend serially generally in a common plane (like a hand-held folding fan). Such a foldable or collapsible panel could also take the form of a flexible thin skin-like material mounted on slats which revolve around a pivot so that it can be closed or collapsed when not in use.

In this embodiment, the base 340 is a substantially half disk. The base 340 is sized so that a curvature of the half disk matches that of the inside surface 28 of the air intake lip 26 of the engine casing 13 so as to be snug fit therein. The base 340 is made of a relatively rigid material and has a thickness which may allow enough frictional engagement with the inside surface 28 of the air intake lip 26 so as to provide a snug fit engagement. A lower surface 344 of the base 340 may include one or more friction pads such as the pad 48 described above to provide frictional engagement with the inside surface 28 of the air intake lip 26. The base 340 may include handling features 352 to manipulate the base 340 with the pole 38 when installing and removing the cover 336 to and from the air intake portion 24 of the engine casing 19. For example, the base 340 could be a circular recess or a hook. In one embodiment, the handling feature(s) 352 is disposed on a front surface 351 of the base 340. The base 340 could be manipulated without the handling feature(s) 352.

Figure 8A:
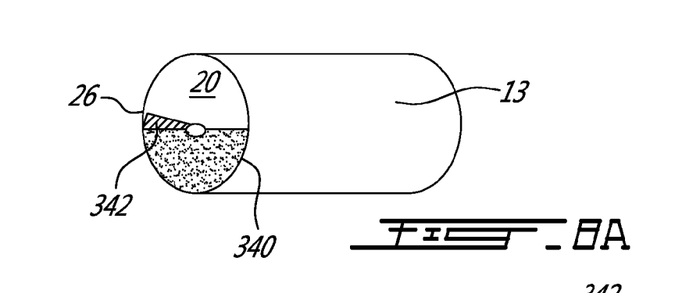
FIGS. 8A to 8C are sequential views illustrating various steps for installing a cover of the type shown in FIG. 7A or 7B onto the gas turbine engine.
Figures 8B, 8C:
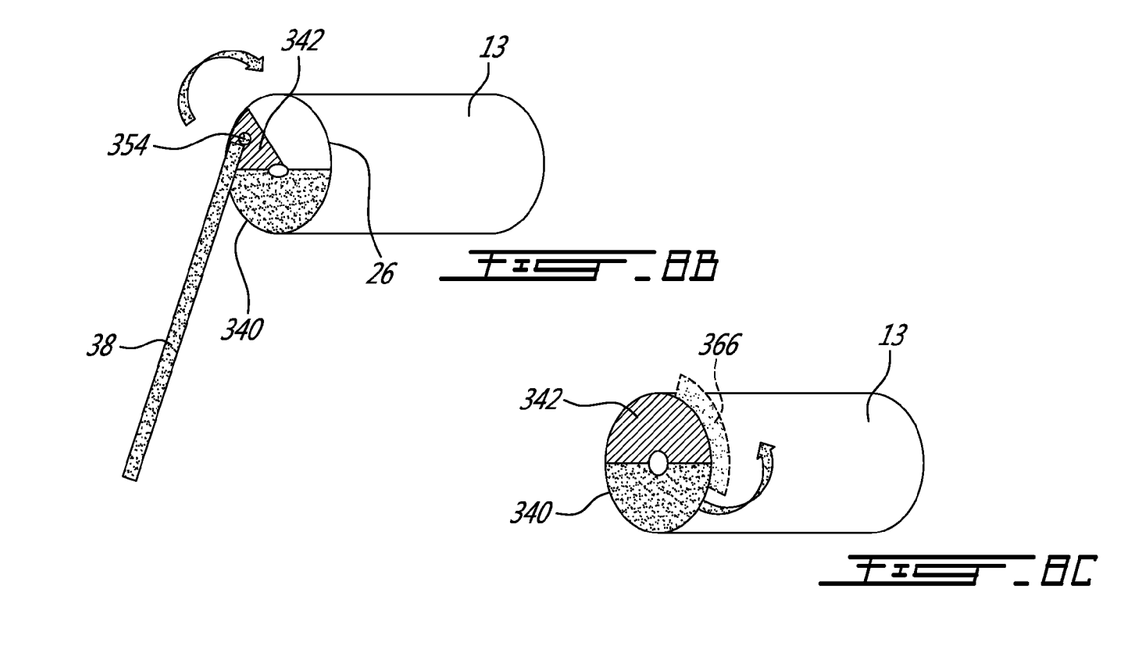

The panel 342 is a substantially half disk complementary to the substantially half disk of the base 340. Depending on a position of the panel 342 relative to the base 340, the cover 336 forms a half disk or a complete disk 378 (shown in phantom). The panel 342 is thus movable about a hinge 380 between two positions, a first position (i.e. collapsed or stowed) where the panel 342 is disposed adjacent and aligned with the base 340, so that the cover 336 forms substantially a half disk, as shown in FIG. 8A, and a second position (i.e. deployed) where the panel 342 is disposed above the base 340 so that the cover 336 forms substantially the full disk 378 thereby closing up the air intake 20, as shown in FIG. 8C. The hinge 380 may be located at a center of the disk 378 formed by the complementary base 340 and panel 342. The panel 342 is movable relative to the base 340 about a central axis 382 of the disk 378 formed by the panel 342 and the base 340. A stopper 384 may block the panel 342 in the deployed position. In one embodiment, the stopper 384 is connected to the base 340 and abuts the panel 342, when the panel 342 is in the second position. In another embodiment, the stopper 384 is integrated in the hinge 380. In yet another embodiment, the stopper 348 is disposed in the panel 342 and abuts the base 340 when the panel 342 is in the second position. The panel 342 may have a diameter slightly smaller than that of the base 340 to allow rotation of the panel 342 about the hinge 380 without friction onto the lip 26 of the engine case 19. In one embodiment, on the first position, the panel 342 is angularly disposed relative to the base 340, as shown in FIG. 7A, to access the handling feature 354, when the base 340 is placed facing the operator.

It is contemplated that the cover 336 could include circumferential flaps distributed about a perimeter of the panel 342 and base 340 that could be flipped to cover the edge 32 and the outside surface 30 of the air intake lip 26, such as flaps 366 shown in FIG. 4C. It is also contemplated that the panel 342 could not be provided in the form of an assembly of slats or panel sections linked in an accordion fashion but instead be a rigid or semi-rigid half disk.

Figure 7B:
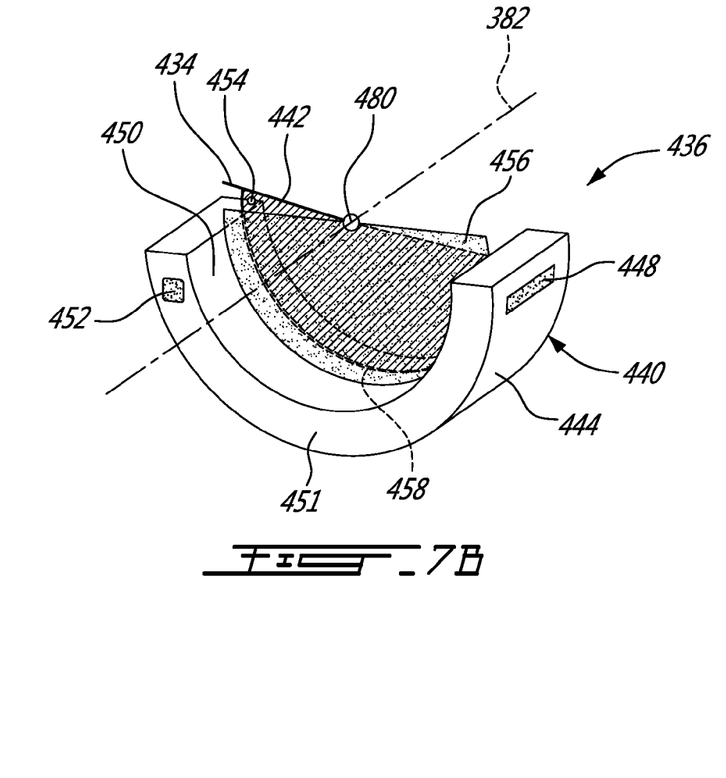
FIG. 7B is a schematic view of a still further alternative of a protective cover for used with the kit shown in FIG. 3.

Turning now to FIG. 7B, another embodiment of a cover 436 which may be used in the kit 34, for covering one of the air intake 20 and exhaust duct 22, includes a base 440 and a rotating panel 442.

The base 440 is similar to the base 40 described above. The base 440 has an arcuate lower surface 444 having a half cylindrical shape conforming to that of the inner surface 28 of the air intake lip 26 of the engine casing 13 so as to mate therein. The base 440 is designed to snuggly fit into the lower portion 46 of the air intake 20. In one embodiment, the lower surface 444 mates with the lower half of the inner surface 28 of the air intake lip 26. The base 440 may include a pad 448 on the lower surface 444. The pad 448 is similar to the pad 48 described above, and will not be described in detail again. The base 440 does not include any fasteners that cooperates with the air intake lip 26 or the engine casing 13 in general. The base 440 is intended to be only snug fitted into the lower portion of the air intake 20 defined by the air intake lip 26, as described above for the base 40. The base 440 may include handling features 452 to manipulate the base 440 with the pole 38 when installing and removing the cover 436 from the air intake portion of the engine casing 13. The handling features 452 are similar to the handling features 52 described above, and will not be described in detail again.

A first panel 456 is fixedly connected to the base 440. The first panel 456 may be made of a rigid or semi-rigid material. In one embodiment, the first panel 456 is a half disk. The base 440 includes a circumferential runner 458 defined in an arcuate upper surface 450 of the base 440. The runner 458 receives a movable second panel 442. The second panel 442 has a shape complementary to the first panel 456, such that they form together a complete disk of a shape of the one of the air intake 20 and exhaust duct 22 they are intended to cover. The second panel 442 is connected to the first panel 456 at hinge 480 which is situated at a center of the disk formed by the complementary first panel 456 and second panel 442. The second panel 442 may pivot relative to the first panel 456 in a plane parallel to the first panel 456. By pivoting the second panel 442 relative to the first panel 456, the second panel 442 may slide in and out the runner 458. The panel 442 is thus movable about the hinge 480 between two positions, a first stowed position where the second panel 442 is disposed adjacent and aligned with the base 440, so that the cover 436 forms substantially a half disk, similarly to the one shown in FIG. 8A, and a second position where the second panel 442 is disposed above the first panel 456 so that the cover 436 forms substantially a full disk thereby closing up the one of the air intake 20 and exhaust duct 22, similarly to the one shown in FIG. 8C. Handling features 454 may be provided on the second panel 442. Also, a retaining feature 434 may be provided to releasably retain the panel 442 in its deployed position upon the panel reaching its deployed position.

It is contemplated that the cover 436 could include circumferential flaps distributed about a perimeter of the panel 442 and base 440 that could be flipped to cover the edge 32 and the outside surface 30 of the air intake lip 26, such as flaps 366 shown in FIG. 8C.

Turning now to FIG. 8A to 8C, positioning of the cover 336 will be described. Positioning of the cover 436 is similar to that of the cover 336, and will therefore not be described again.

To position the cover 336 onto the air intake portion 24 of the engine case 13, the operator, first positions the base 340 with the panel 342 in the first position, into the lower portion 46 of air intake portion, at the inner surface 28 of the air intake lip 26. The operator may manually place it with his/her hands directly or with the use of the pole 38 engaged with the handling features 352 of the base 340. The operator may step onto the storage box 70, should the storage box 70 be provided in the kit 34, to facilitate the positioning of the base 40. When the base 340 is installed in the air intake portion 24, the cover 336 forms substantially a half disk (see FIG. 8A). When disposed into the inside surface 28 of the air intake lip 26, the front surface 351 of the base 340 or of the panel 342 may be aligned with the edge 32 of the air intake lip 26.

Once the base 340 is snuggly fitted into the air intake portion, the operator may temporarily connect the pole 38 to the handling features 354 of the panel 342 so as to rotate the panel 342 about the central axis 382 from the collapsed position to the deployed position. By rotating the panel 342, the operator gradually closes the air intake 20 (see FIG. 8B). Rotation of the panel 342 terminates when the panel 342 abuts the stopper 384 (the fully deployed position is shown in FIG. 8C). The rotation of the panel 342 spans over about 180 degrees. Should the cover 336 include circumferential flaps, the operator may use the pole 38 to fold the circumferential flaps onto the outer surface 30 of the air intake lip 26. The operator may then disengage the pole 38 from the handling features 354 of the panel 342 and store the pole 38 and box 70 away.

To remove the cover 336, the user may step back on the box 70 and use the pole 38 to flip the flaps, should the cover 336 have flaps, and to rotate the panel 342 from the second position to the first position. The user then removes the snug fit base 340 from the air intake lip 26 and may store it with the pole 38 in the storage box 70.

The above described covers and tools allow to easily place a temporary cover onto the air intake or exhaust of the gas turbine engine, without requiring to climb on a ladder. The installation may be performed by a single operator in a minimal amount of time. The cover and pole may be easily stowed in a storage box which may double as a step, therefore reducing a number of tools needed to install the cover.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A method of covering an opening at one end of an aircraft engine, the method comprising:
   fitting a base of an engine cover into a lower portion of the opening of the aircraft engine, the base having an arcuate lower surface configured to mate with an inner surface of a lip of the opening of the aircraft engine, the cover having a panel movably connected to the base;
   using a handling tool for engaging the panel and subsequently using the handling tool for moving the panel from a collapsed position to a deployed position in which the panel extends upwardly from the base to close the opening of the aircraft engine; and
   releasably retaining the panel in said deployed position by engaging at least one attachment on a front face of the base with a corresponding attachment on an inwardly facing surface of the panel.

2. The method of claim 1, wherein the panel is operated from the ground through the use of the handling tool.

3. The method of claim 1, wherein the handling tool includes a telescopic pole, and wherein the method comprises adjusting a length of the telescopic pole to reach the panel from ground level.

4. The method of claim 1, wherein the panel has at least one handling feature accessible while the panel is in said collapsed position and said deployed position, and wherein the method comprises using the handling tool to manipulate the panel via the at least one handling feature of the panel.

5. The method defined in claim 1, wherein moving the panel comprises pivoting the panel relative to the base.

* * * * *